US012790127B2

(12) United States Patent
Mohan et al.

(10) Patent No.: US 12,790,127 B2
(45) Date of Patent: Nov. 10, 2026

(54) MULTI-PIECE SPROCKET

(71) Applicant: Laitram, L.L.C., Harahan, LA (US)

(72) Inventors: Jake A. Mohan, Grand Rapids, MI (US); Michael Hendrik DeGroot, Rockford, MI (US); Gerko Hulshof, Aalten (NL); Peter Hilkhuijsen, Enschede (NL); Paul A. Marsman, Wyoming, MI (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 19/161,520

(22) PCT Filed: Mar. 5, 2024

(86) PCT No.: PCT/US2024/018481
§ 371 (c)(1),
(2) Date: Sep. 2, 2025

(87) PCT Pub. No.: WO2024/186793
PCT Pub. Date: Sep. 12, 2024

(65) Prior Publication Data

US 2026/0242148 A1 Aug. 20, 2026

Related U.S. Application Data

(60) Provisional application No. 63/450,147, filed on Mar. 6, 2023.

(51) Int. Cl.
*B65G 23/06* (2006.01)
*F16H 55/12* (2006.01)

(52) U.S. Cl.
CPC ............. *B65G 23/06* (2013.01); *F16H 55/12* (2013.01)

(58) Field of Classification Search
CPC ................................ B65G 23/06; F16H 55/12
See application file for complete search history.

(56) References Cited

U.S. PATENT DOCUMENTS 2,451,690 A * 10/1948 Oehler .................... F16H 55/30 474/160
5,316,522 A * 5/1994 Carbone ................. F16H 55/12 474/903
5,511,893 A * 4/1996 Kilgus ...................... H01H 3/10 403/294
6,516,944 B2 * 2/2003 Guldenfels ............ B65G 17/08 198/853
8,668,075 B2 * 3/2014 Guldenfels ............... B08B 3/02 198/495
8,776,989 B2 * 7/2014 Guldenfels ............... B08B 3/02 198/845

(Continued)

FOREIGN PATENT DOCUMENTS

WO 2000047916 A1 8/2000

*Primary Examiner* — Henry Y Liu
(74) *Attorney, Agent, or Firm* — Catherine M. Bishop

(57) ABSTRACT

A multi-piece sprocket for conveyor belts or chains comprises a first section and a second section that mates with the first section to form a sprocket with drive teeth distributed about the periphery and a central hub for retaining a shaft. The second section is inserted into a space in the first section and rotated into an engaged position so that curved hooks enter curved channels in the first section to form a complete sprocket. A locking mechanism can secure the two sections together.

18 Claims, 8 Drawing Sheets

(56) References Cited

U.S. PATENT DOCUMENTS

| | | | | |
|---|---|---|---|---|
| 9,097,332 | B2 * | 8/2015 | Li | F16H 55/12 |
| 9,115,802 | B2 * | 8/2015 | Guldenfels | B65G 23/06 |
| 9,751,697 | B2 * | 9/2017 | Ma | B65G 23/06 |
| 11,685,609 | B2 * | 6/2023 | Brown, Sr. | F16H 55/171<br>198/834 |
| 2002/0020612 | A1 * | 2/2002 | Guldenfels | B65G 23/06<br>59/5 |
| 2008/0190462 | A1 * | 8/2008 | Guldenfels | B08B 3/02<br>134/44 |
| 2009/0050185 | A1 * | 2/2009 | Guldenfels | B65G 23/06<br>134/122 R |
| 2011/0094856 | A1 * | 4/2011 | Guldenfels | F16H 55/30<br>198/834 |
| 2012/0073936 | A1 * | 3/2012 | Guldenfels | B65G 23/06<br>198/494 |
| 2012/0318633 | A1 * | 12/2012 | Gattrugeri | B65H 75/247<br>192/41 S |
| 2013/0228421 | A1 * | 9/2013 | Harrelson | B65G 23/06<br>198/834 |
| 2014/0305241 | A1 * | 10/2014 | Li | F16H 55/12<br>74/448 |
| 2016/0312874 | A1 * | 10/2016 | Ma | B65G 23/06 |
| 2017/0247193 | A1 * | 8/2017 | Elhassouni | F16H 55/02 |
| 2022/0169449 | A1 * | 6/2022 | Brown, Sr. | F16H 55/171 |
| 2025/0011097 | A1 * | 1/2025 | DeGroot | B65G 23/06 |

* cited by examiner

MULTI-PIECE SPROCKET

RELATED APPLICATIONS

This application claims priority to US Provisional Patent Application Ser. No. 63/450,147, filed Mar. 6, 2023 and entitled "Multi-Piece Sprocket" the contents of which are herein incorporated by reference.

BACKGROUND

The invention relates generally to sprockets and other conveyor components that can be assembled on a shaft in an endless conveyor belt system.

Sprockets are used to drive endless power-transmission and conveyor belts and chains. Each sprocket is mounted on a shaft received by a bore extending axially through the sprocket. The shaft is supported at both ends by bearing blocks mounted to a conveyor frame. A gearbox or a belt-driven pulley mounted to an end of the shaft makes the shaft a driveshaft. Installing a one-piece sprocket on a driveshaft requires that at least one bearing block be removed to slide the sprocket axially onto the shaft. Typically, the shaft also has to be lifted out of the conveyor side frame. Other components that may be mounted on a shaft in a conveyor include, but are not limited to, rollers, position limiters, belt guards, belt supports and other known components.

Split sprockets that are split along seams through their bores can be installed on shafts without removing bearing blocks. A first piece of the split sprocket is positioned on the shaft. Then, a complementary second piece is mated to the first piece. The two pieces are fastened to each other, usually by a pair of bolts or screws. One version of a split sprocket used with conveyor belts has two identical halves that fit together with mating puzzle-piece structure. Screws through the puzzle-piece structure at both seams tighten the pieces together. But the two screws do not provide much resistance to axial shifting of one sprocket half relative to the other. In addition, the need for tools to assemble the sprockets complicates assembly and disassembly and also presents potential cleanliness issues, potentially inhibiting hygiene.

SUMMARY

One version of a multi-piece sprocket embodying features of the invention comprises first and second sprocket sections that mate to form a sprocket with drive teeth distributed about the periphery thereof. A central hub in the sprocket retains a shaft. The first section includes an open peripheral portion and an open hub connected to the open peripheral portion. The second section forms a cap to close the peripheral portion and open hub. The second section in inserted into a space formed by the first section in a first orientation and rotated into a second orientation to mate with the first section to form a complete sprocket.

According to an embodiment, a sprocket for a conveyor belt comprises a first section with a passageway and a second section inserted in the passageway. The first section has a curved peripheral portion defining driving elements, a hub radially inward of the peripheral portion for receiving a shaft, a passageway extending along a radial axis from a space in the curved peripheral portion to the hub and a first set of curved channels extending through the first sprocket section from a first face to a second face. The first set of curved channels curve about the radial axis. The second sprocket section completes the peripheral portion and hub and includes a first set of curved protrusions configured to be received in the curved channels when the second sprocket section is rotated about the radial axis from a first orientation in which the second sprocket section is inserted in the passageway to a mating position completing the peripheral portion and hub.

According to another aspect, a sprocket for a conveyor belt comprises a first sprocket section having a curved peripheral portion defining driving elements, a hub radially inward of the peripheral portion for receiving a shaft, a passageway extending along a radial axis from a space in the curved peripheral portion to the hub, a first set of curved channels in a peripheral surface of the peripheral portion forming curved, shaped projections between the passageway and first set of curved channels and a second set of curved channels adjacent to the hub, the second set of curved channels intersecting the passageway and extending through the first sprocket section from a first face to a second face. A second sprocket section is inserted in the passageway to complete the peripheral portion and hub. The second sprocket section includes hooks at a peripheral end configured to be received in the first set of curved channels and curved tabs at an inner end configured to be received in the second set of curved channels. The second sprocket section is rotated about the radial axis from a first orientation in which the second sprocket section is inserted in the passageway to a mating position completing the peripheral portion and hub.

According to another aspect, a sprocket assembly for a conveyor belt comprises a shaft and a split sprocket mounted on the shaft. The shaft includes an opening in an outer surface. The split sprocket comprises a first sprocket section including an open hub for receiving the shaft, a positioning nub on a wall of the open hub configured to engage the opening in the shaft, a peripheral portion, a passageway along a radial axis between the hub and the peripheral portion, at least one curved channel extending from a first face to a second face. The second sprocket section includes at least one curved protrusion configured to be received in the curved channel. The second sprocket section is rotated about the radial axis from a first orientation in which the second sprocket section is inserted in the passageway to a mating position completing the peripheral portion and hub.

DETAILED DESCRIPTION

A multi-piece sprocket or other conveyor component for driving or otherwise engaging a conveyor belt comprises multiple portions that mate together about a rotatable shaft. The invention will be described below relative to certain illustrative embodiments, though the invention is not limited to the illustrative embodiments.

Figure 1:
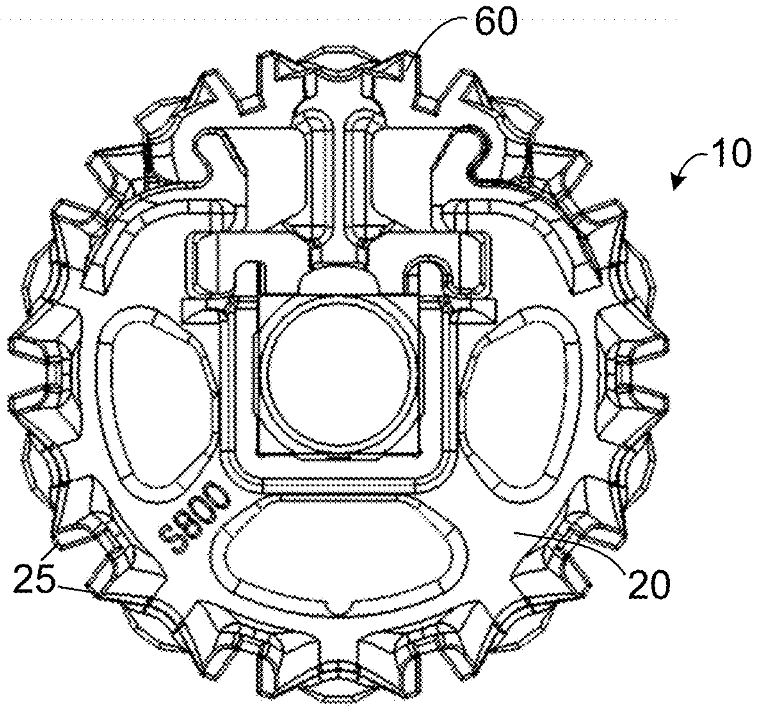
FIG. 1 is a front view of an assembled multi-piece sprocket according to an embodiment of the invention.
Figure 2:
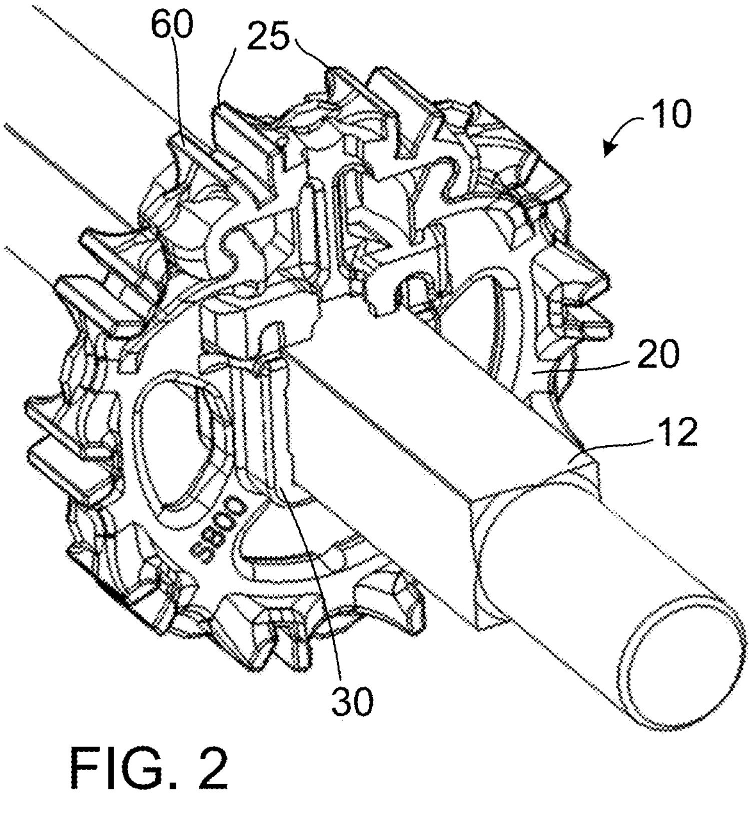
FIG. 2 is an isometric view of the multi-piece sprocket of FIG. 1 mounted to a shaft.
Figure 3:
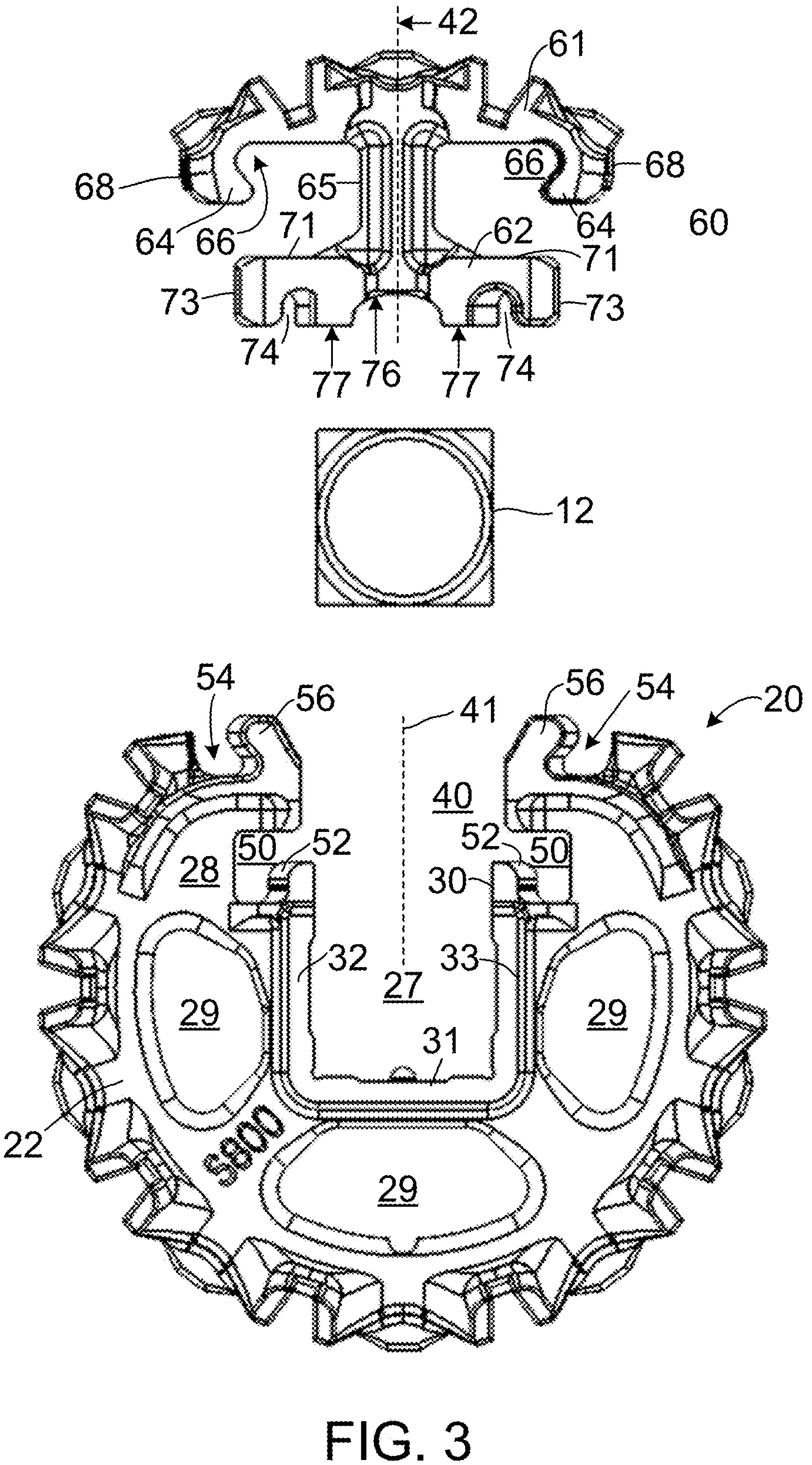
FIG. 3 is an exploded view of the multi-piece sprocket and shaft of FIG. 2.

One version of a multi-piece sprocket mounted on a shaft 12 embodying features of the invention is shown in FIGS. 1-3. The illustrative multi-piece sprocket 10 comprises two sections: a first section, shown as a base portion 20, and a second section, shown as a cap portion 60. The cap portion 60 mates with the base portion 20 to form a complete sprocket having peripheral drive elements, shown as teeth 25, for engaging drive structure on a conveyor chain or belt. The illustrative teeth are spaced equally around the circumference of the periphery at a constant pitch. However, the invention is not limited to the illustrative drive element configuration, and the drive structure may have any suitable size, shape, pitch and configuration suitable for engaging a conveyor belt or chain, and alternatively, may comprise a roller without drive elements. In the illustrative embodiment, the base portion and the cap portion are joined together in a puzzle pattern to form the complete sprocket, though any suitable connection means may be used to join together the two sections. The invention is not limited to a sprocket that drives a conveyor belt, and may encompass any multi-piece conveyor component mounted on a shaft.

Each section 20, 60 may comprise a single unitary piece or multiple subpieces coupled together. In this example, the two sections are shaped differently, with the first section 20 being the larger section. The illustrative base portion 20 is curved and spans the majority of the circumference of the sprocket except for a space in the periphery, with the cap portion 60 inserted in the space and completing the circumference when mated to the base portion 60. In the mated position, the end faces of the sections 20, 60 align, but the invention is not so limited.

The sprocket 10 includes a collar or central hub 30 defining a central opening 27 for receiving a shaft 12, as shown in FIGS. 2 and 3. The shaft is mounted to or otherwise connected to a conveyor frame.

The hub portion 30 is formed within the base portion 20 and connected to a curved peripheral portion 22 of the base portion 20 by a webbing 28 with openings 29, but any suitable means, such as spokes or a solid structure for connecting the central hub portion 30 to the peripheral portion 22 may be used. The illustrative hub portion 30 comprises three perpendicular walls 31, 32, 33 in the base portion for engaging the shaft 12 and an open end extending to a passageway 40 for receiving the cap portion 60. The passageway extends from a peripheral space in the rim 22 to the hub 30 and receives and locks the cap portion 60. The hub portion 30 may have any suitable shape for engaging a shaft, which is not limited to a square cross-section as shown.

The passageway 40 has a width that is greater than the thickness of the cap portion 60, so that the cap portion 60 can slide into the passageway 40 when placed in an orientation perpendicular to the orientation of the assembled sprocket.

The hub 30 may include cleaning recesses on the inner surfaces thereof for allowing space between the shaft 12 and hub 30 to promote cleanliness and facilitate cleaning, but the invention is not so limited.

The base portion 20 further includes inner curved channels 50 adjacent the hub side walls 32, 33 and intersecting the passageway 40. The inner curved channels extend through the base portion from a first face to a second face and curve about a radial axis 41 defining the passageway 40, i.e., the center of curvature of the curve coincides with the radial axis 41. The inner curved channels 50 include shaped, rounded surfaces 52. The channels 50 may include two portions that are substantially perpendicular to each other, a first portion open to the passageway 40 and a second portion parallel to the radial axis 41, but the invention is not so limited.

The base portion 20 further includes outer curved channels 54 in a peripheral surface. The outer curved channels 54 also curve about the radial axis 41 and extend through the base portion from the first face to the second face, but are disposed farther from the radial axis 41 than the inner curved channels 50. Curved, shaped projections 56 extend away from the passageway 40 between the passageway and the outer curved channels 54. The illustrative outer curved channels 54 have a hook-shaped cross-section, but the invention is not so limited.

The cap portion 60 is configured to be inserted into the shaped passageway 40 while in a first orientation, then rotate into a locked position, as described below. Prior to inserting the cap portion 60, the shaft 12 is inserted into the central opening 27 via the shaped passageway. The shaped passageway 40 is configured and sized to allow the shaft 12 to pass therethrough.

Figure 4:
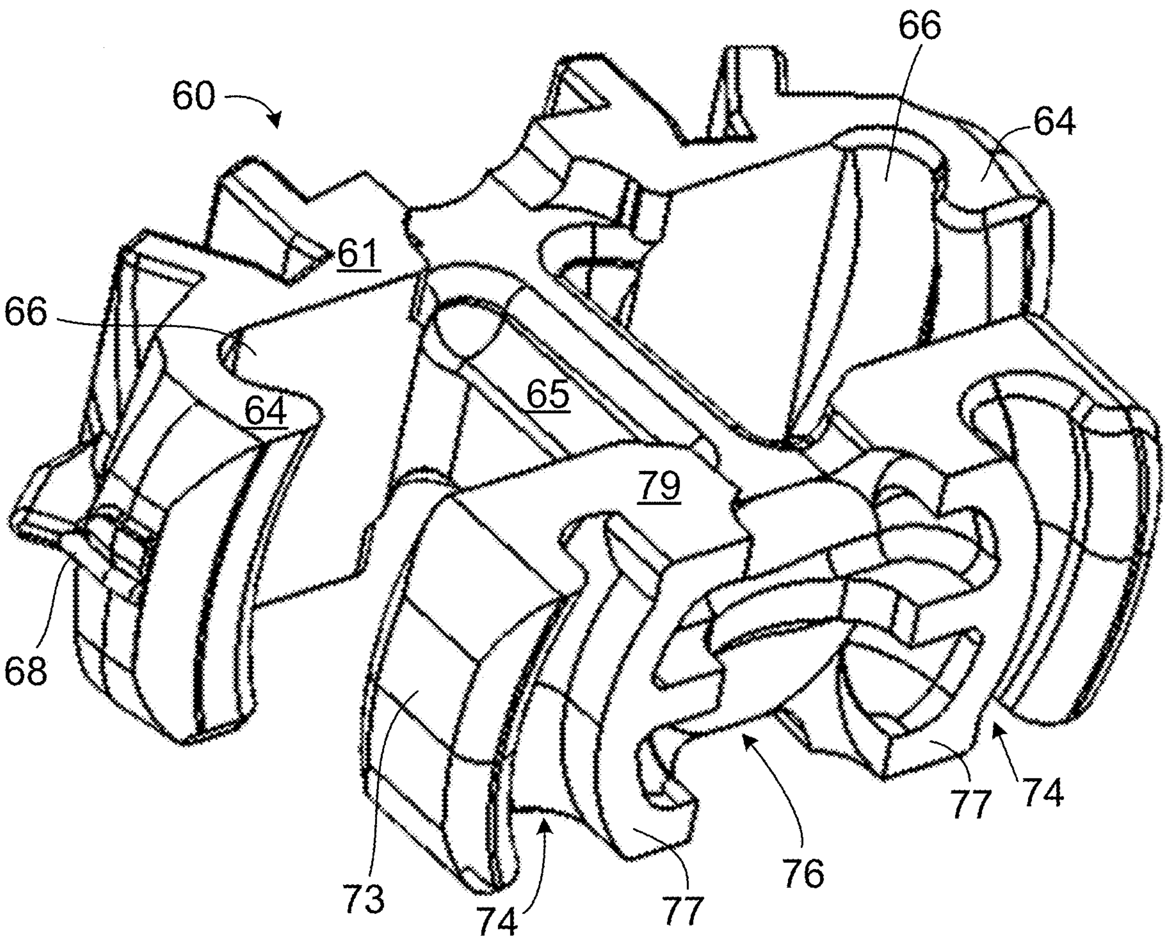
FIG. 4 is an isometric view of the cap portion of the multi-piece sprocket of FIG. 1.

The illustrative cap portion 60, as shown in FIGS. 3 and 4, comprises a shaped body extending along a central axis 42 from a peripheral end 61 configured to complete the periphery of the sprocket 10 to an inner end 62 configured to complete the central opening 27. A connecting portion 65, shown as a spoke, connects the peripheral end 61 to the inner end 62. The peripheral end 61 includes drive elements to complete the pattern of teeth 25.

The peripheral end 61 terminates in hooks 64 configured to be received in outer curved channels 54. The hooks form shaped, curved recesses 66 that engage the curved, shaped projections 56 in the base portion 20. The illustrative hooks 64 have flat bottoms, curved tips and angled inner surfaces to match the curved shaped projections 56 of the base portion, but the invention is not so limited.

The inner end 62 of the cap portion 60 is configured to engage the inner curved channels 50 and shaped surfaces 52 of the base portion 20. The illustrative inner end includes flat radially outer walls 71. Curved side walls 73 and curved channels 74 form curved tabs that extend from a first side to a second side and curve about the central axis 42. The curved tabs formed by the curved side walls 73 and curved channels 74 are designed to be received in the inner curved channels 50, and the curved channels 74 receive the shaped surfaces 52. The illustrative inner end 62 further includes a recess 76 between flat surfaces 77 that abut the shaft 12 when the sprocket is assembled.

The end faces of the cap portion 60, such as end face 79, are substantially flat and configured to align with the end faces of the base portion 20 when the sprocket is assembled.

The sprocket 10 may further include a latch for securing the base portion 20 and cap portion 60 together. The illustrative latch comprises locking tabs 68 on the outside surfaces of the hooks 64 of the cap portion 60 that engage locking recesses in the outer curved channels 54 of the base portion 20, but the invention is not so limited.

Figure 5:
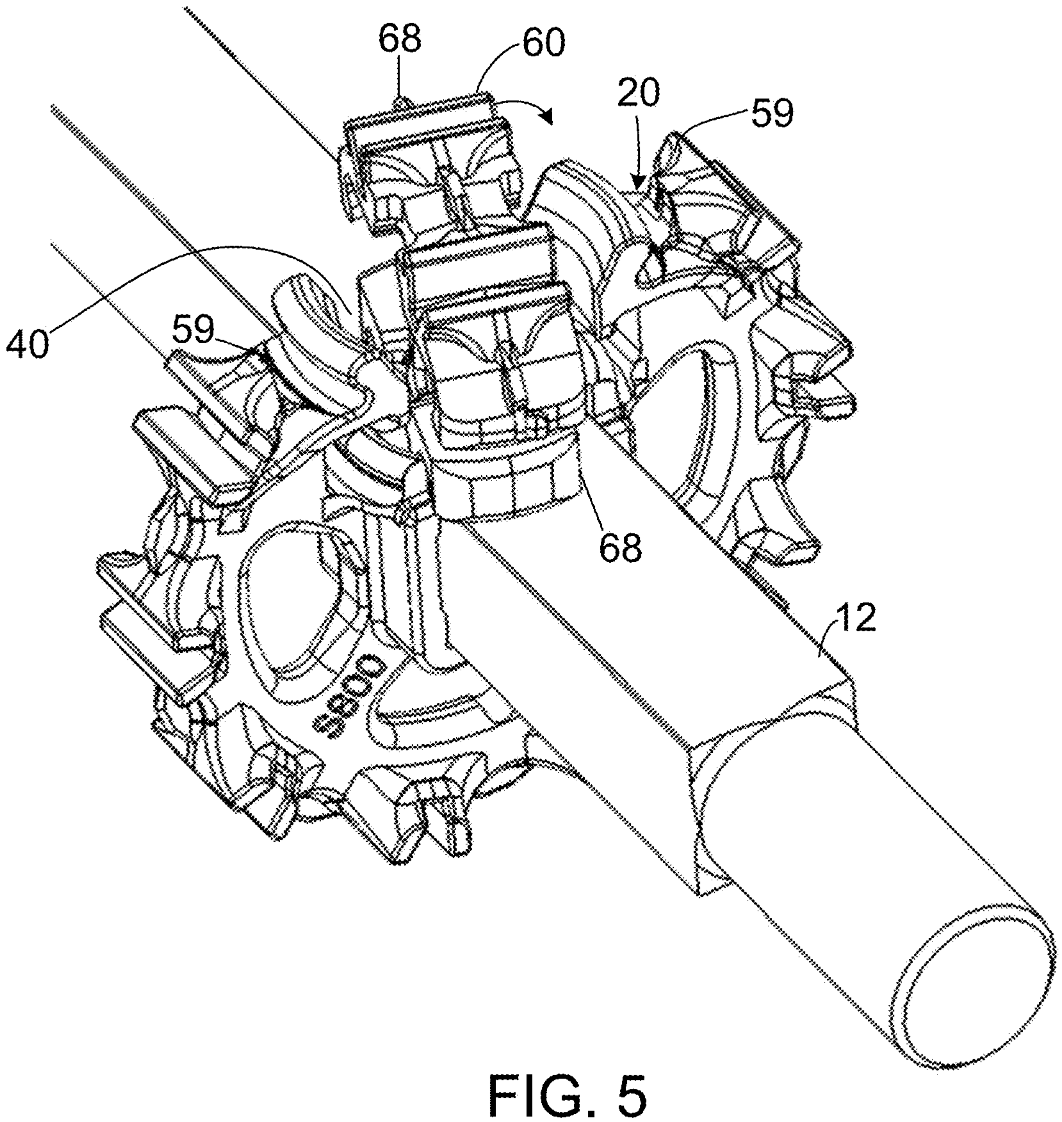
FIG. 5 shows the multi-piece sprocket of FIG. 2 during assembly on the shaft.

As shown in FIG. 5, the sprocket 10 is assembled by first inserting the shaft 12 through the passageway 40 so that the shaft 12 is seated within the hub 30. Then, the cap portion 60 is orientated either perpendicular to the passageway 40 or at an angle relative to the longitudinal axis of the shaft 12, as shown in FIG. 5. In this orientation, the cap portion 60 protrudes longitudinally from the passageway 40. The cap portion 60 is moved into an engageable position, with the flat surfaces 77 abutting the shaft 12 and radial axis 41,42 align. Then, the cap portion 60 is rotated about the radial axis 42 so that the hooks 64 enter the channels 54 and the protrusions formed by the curved side walls 73 and curved channels 74 enter the inner curved channels 50 of the base portion 20, and curved channels 74 of the cap portion 60 received the shaped surfaces 52 of the base portion 20. The cap portion 60 rotates until the complete sprocket 10 is formed.

The locking tabs 68 of the cap portion 60 may snap fit into locking recesses 59 in the base portion 20 to secure the cap portion 60 in the mated position. Other suitable means for latching the two portions together in an assembled position may be used.

Figure 6:
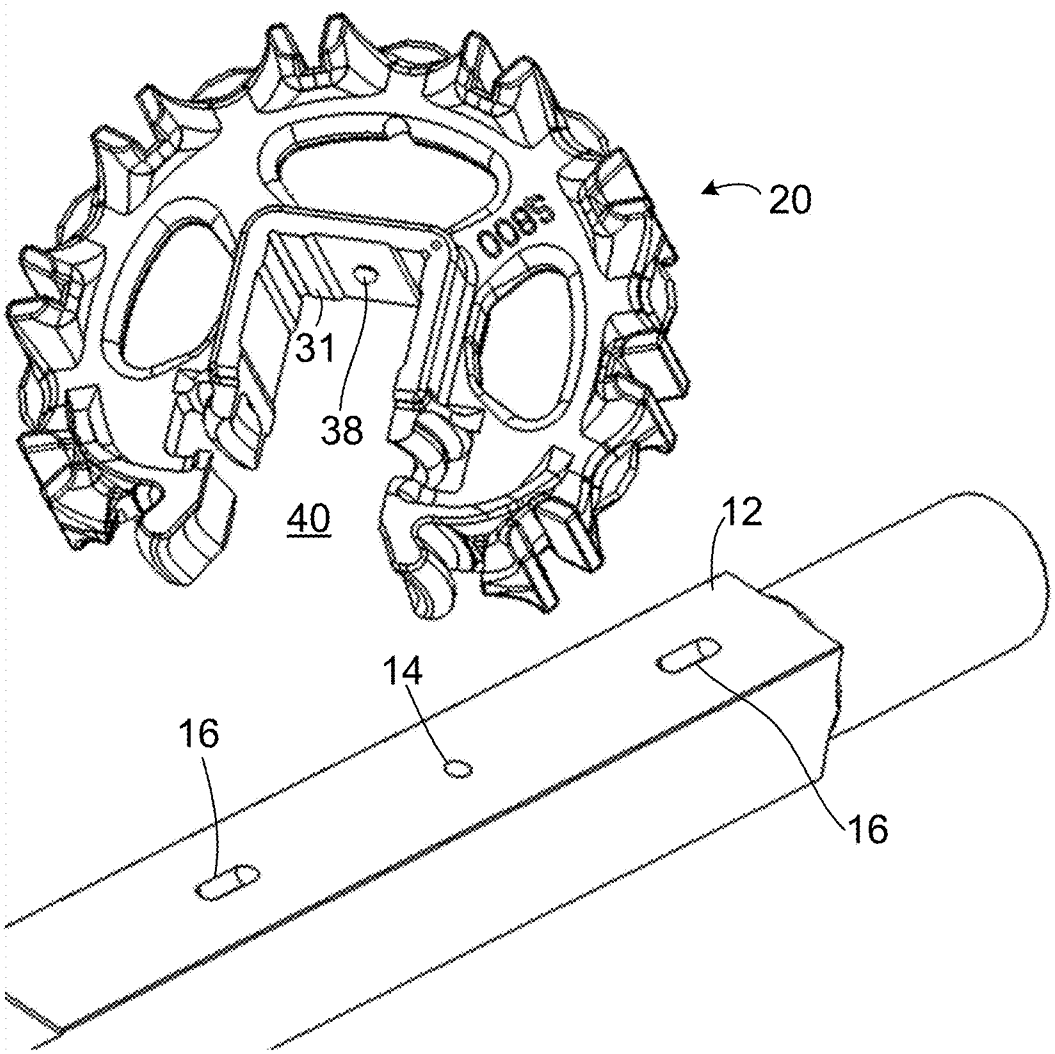
FIG. 6 shows the base portion of the multi-piece sprocket including a positioning nub and a corresponding shaft including features to engage the positioning nub.

As shown in FIG. 6, the base portion 20 may include an axial positioning nub 38 on the wall 31 opposite the passageway 40 to facilitate axial positioning of the sprocket 10 on the shaft 12. The illustrative shaft 12 includes positioning recesses to engaging the axial positioning nub. One or more shaft positioning recesses can be a smaller opening, such as round hole 14 for locking the axial position of a sprocket. Other shaft positioning recesses can be slots 16 to allow some float of a sprocket mounted in that location. In another embodiment, the base portion and-or shaft may include cooperating chamfers and-or grooves to facilitate axial placement of the sprocket on the shaft. Other suitable shaft-positioning means may be used, and the invention is not limited to nubs, recesses, grooves and-or chamfers.

Figure 7:
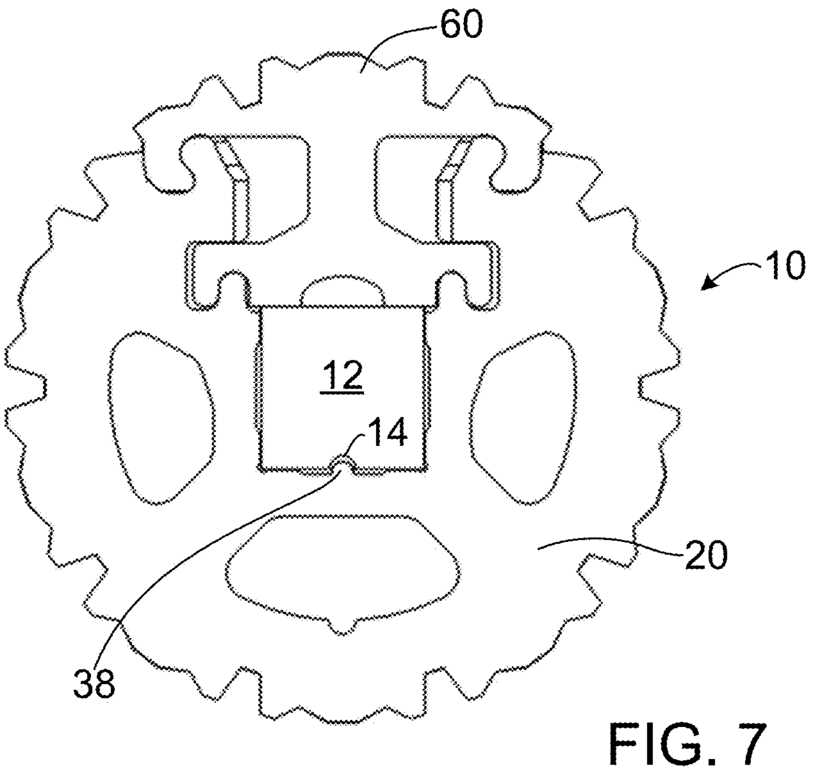
FIG. 7 is a cross-sectional view of the assembled multi-piece sprocket of FIG. 1
Figure 8:
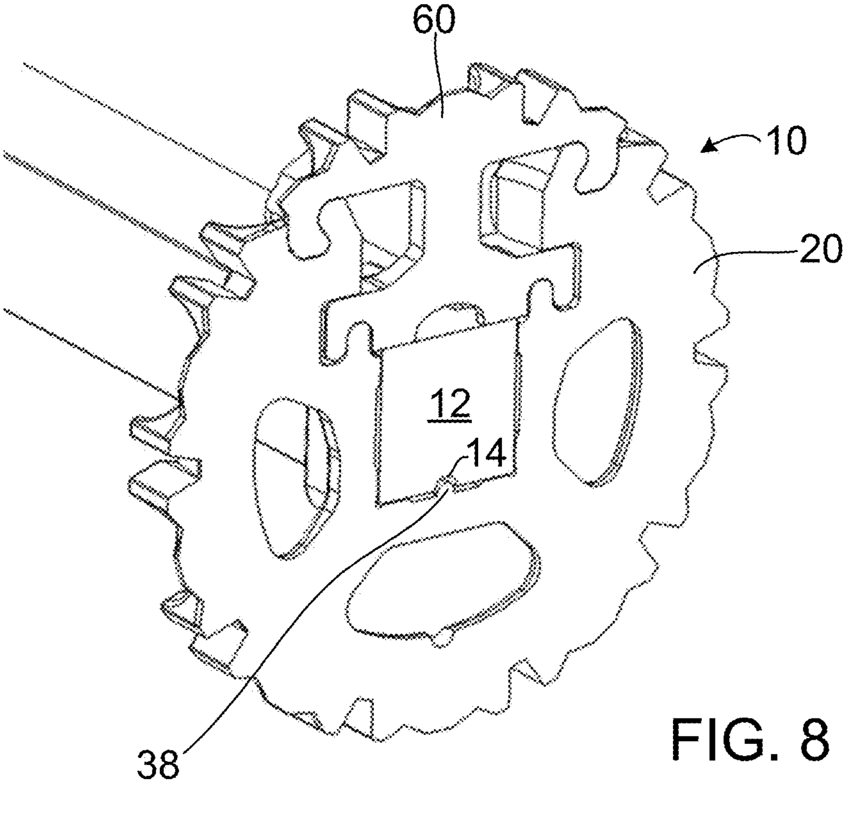
FIG. 8 is another cross-sectional view of the assembled multi-piece sprocket of FIG. 1.

FIGS. 7 and 8 are cross-sectional views of the assembled sprocket 10 on the shaft 12, with a positioning tab 38 engaging a positioning recess 14, and showing the engagement between the hooks and channels when the cap portion 60 mates with the base portion 20.

Figure 9:
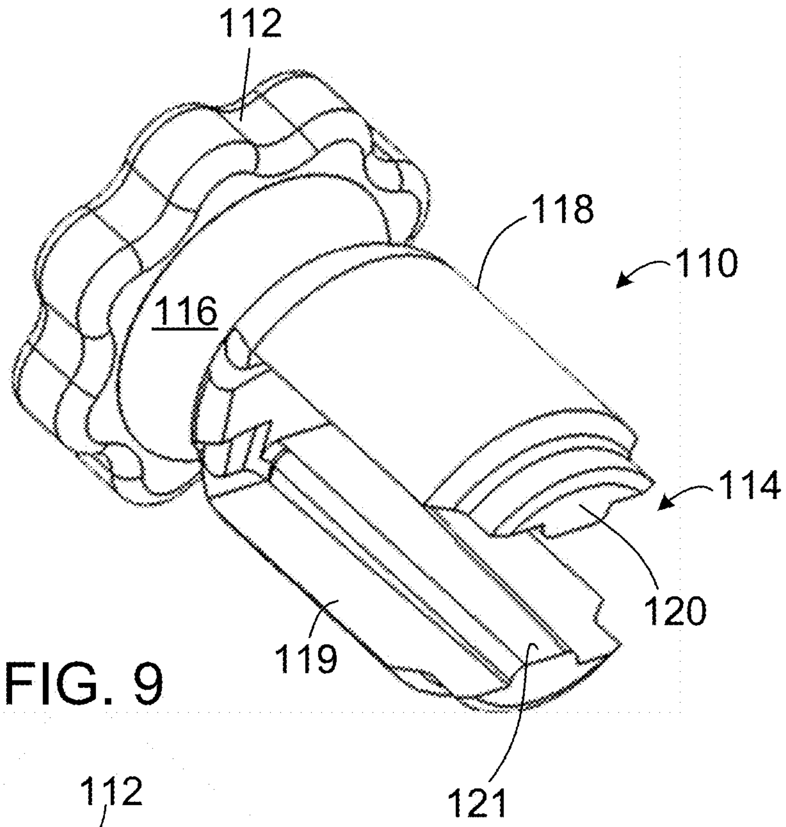
FIG. 9 is an isometric view of a tool used to assemble the multi-piece sprocket of FIG. 1 according to an embodiment.
Figure 10:
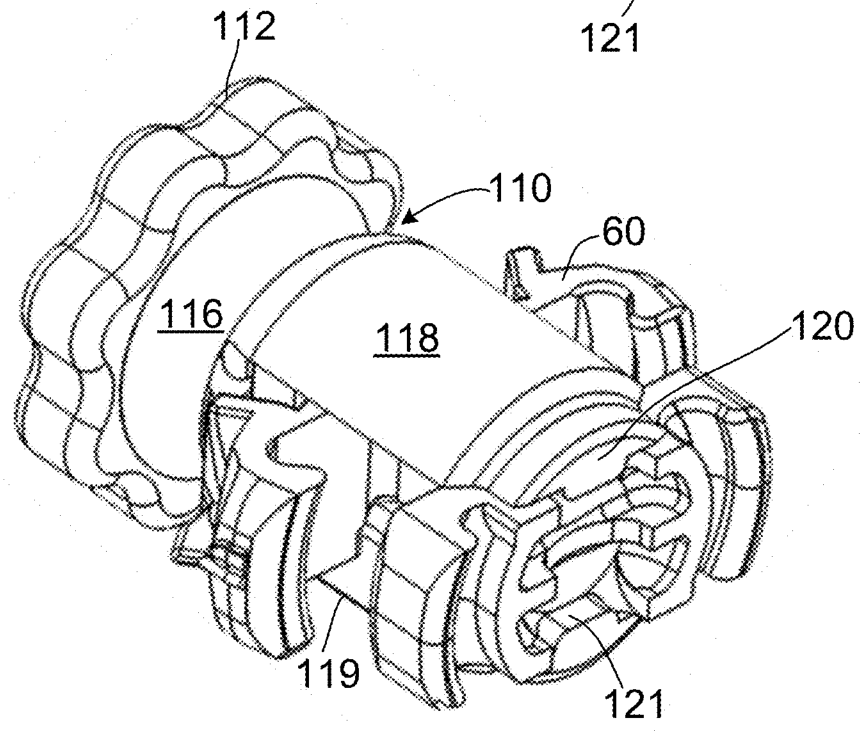
FIG. 10 shows the tool of FIG. 9 with the cap portion of FIG. 4 mounted therein.

In one embodiment, shown in FIGS. 9 and 10, a tool 110 can be used to insert and rotate the cap portion 60 within the shaped passageway 40 of the base portion 20 to form a complete sprocket 10. The illustrative tool 110 includes a handle 112 and a seating portion 114 extending from the handle 112. The seating portion 114 includes a base 116 and a pair of spaced-apart parallel legs 118, 119 for holding the cap portion 60 therebetween, as shown in FIG. 10.

The legs 118, 119 can have inner bars 120, 121 interface with corresponding recesses in the faces of the cap portion 60 to facilitate handling of the cap portion 60.

Figure 11A:
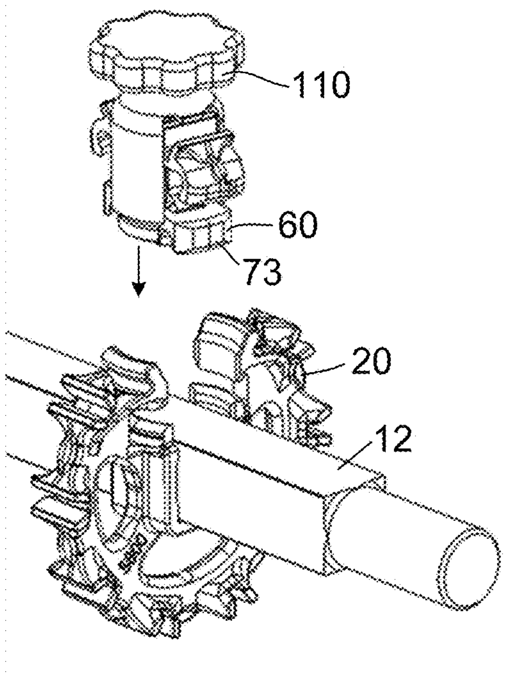
FIGS. 11A-11D show the steps involved in assembling the multi-piece sprocket on a shaft.
Figure 11B:
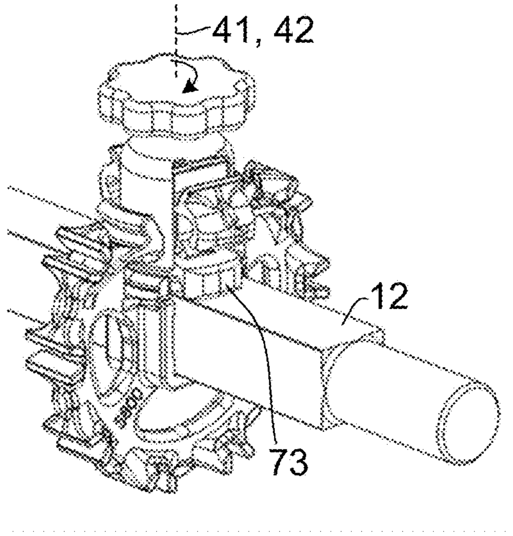

FIGS. 11A-11D show the steps involved in assembling the illustrative sprocket 10 on a shaft 12 using a tool 110. First, as shown in FIG. 11A, the shaft 12 is inserted through the passageway 40 and into the hub 30 at a select axial position. The cap portion 60 is mounted in the tool 110 and brought above the passageway 40. In an insertion orientation, shown in FIGS. 11A and 11B, the legs 118, 119 of the tool 110 face the walls of the passageway 40 and the cap portion 20 is oriented at an angle relative to its assembled position. For example, the cap portion 20 can be oriented so that the curved side walls 73 and locking tabs 68 face the longitudinal direction of the shaft 12 and protrude from the passageway 40. In this orientation, the tool and cap portion can fit into the passageway 40 and the axis 42 of the cap portion 60 aligns with the axis 41 of the passageway.

Figure 11C:
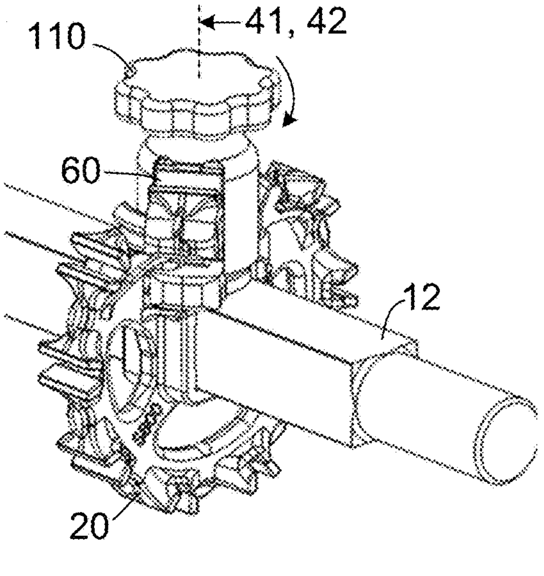
Figure 11D:
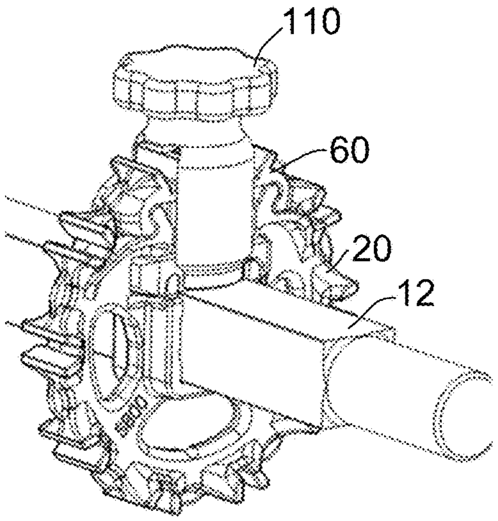

After the flat surfaces 77 on the inner end of the cap portion 60 abut the shaft 12, the tool 110 rotates the cap portion 60 about axes 41, 42 to move the cap portion 60 into engagement with the base portion 20, as shown in FIGS. 11C and 11D.

Then, the tool 110 can be removed, leaving the complete sprocket 10 mounted on the shaft 12.

The sprocket can be disassembled through a reverse process.

Although the invention has been described in reference to a version of a sprocket, other versions are possible. For example, the periphery does not have to be toothed; it could be smooth like a roller, or grooved like a pulley. So, the term sprocket as used in the claims is meant to encompass multi-piece wheels with or without teeth on their peripheries.

What is claimed is:

1. A sprocket for a conveyor belt comprising:
- a first sprocket section having
  - a curved peripheral portion for contacting a conveyor belt;
  - a hub radially inward of the peripheral portion for receiving a shaft;
  - a passageway extending along a radial axis from a space in the curved peripheral portion to the hub;
  - a first set of curved channels extending through the first sprocket section from a first face to a second face, the first set of curved channels curving about the radial axis;
  - and
- a second sprocket section inserted in the passageway to complete the peripheral portion and hub, the second sprocket section including
  - a first set of curved protrusions configured to be received in the curved channels when the second sprocket section is rotated about the radial axis from a first orientation in which the second sprocket section is inserted in the passageway to a mating position completing the peripheral portion and hub.

2. The sprocket of claim 1, wherein the first set of curved channels are adjacent the hub.

3. The sprocket of claim 2, wherein the first sprocket section comprises a second set of curved channels formed in the peripheral portion for receiving hooks in the second sprocket section.

4. The sprocket of claim 3, wherein the second set of curved channels includes locking recesses for receiving locking tabs on the outside surfaces of the hooks of the second sprocket section to lock the first sprocket section to the second sprocket section.

5. The sprocket of claim 1, wherein the curved peripheral portion include drive elements for driving the conveyor belt.

6. The sprocket of claim 1, wherein each curved channel includes a first portion open to the passageway and a second portion substantially perpendicular to the first portion.

7. The sprocket of claim 1, wherein the hub includes an axial positioning nub on a wall opposite the passageway to facilitate axial positioning of the sprocket on the shaft.

8. The sprocket of claim 1, wherein the second sprocket section comprises a neck extending along a central axis from a peripheral end configured to complete the curved peripheral end to an inner end configured to complete the hub to define a central opening for a shaft.

9. The sprocket of claim 8, wherein the peripheral end of the second sprocket section includes hooks that form shaped, curved recesses configured to be received in the first set of curved channels of the first sprocket section.

10. The sprocket of claim 8, wherein the inner end includes curved side walls and curved channels inset from the curved side walls to form protrusions configured to be received in the curved channels of the first sprocket section, flat radially outer walls and inner walls configured to abut a shaft when the sprocket is assembled.

11. A sprocket for a conveyor belt comprising:
- a first sprocket section having
  - a curved peripheral portion defining driving elements;
  - a hub radially inward of the peripheral portion for receiving a shaft;
  - a passageway extending along a radial axis from a space in the curved peripheral portion to the hub;
  - a first set of curved channels in a peripheral surface of the peripheral portion forming curved, shaped projections between the passageway and first set of curved channels;
  - a second set of curved channels adjacent to the hub, the second set of curved channels intersecting the passageway and extending through the first sprocket section from a first face to a second face; and
- a second sprocket section inserted in the passageway to complete the peripheral portion and hub, the second sprocket section including
  - hooks at a peripheral end configured to be received in the first set of curved channels; and
  - curved tabs at an inner end configured to be received in the second set of curved channels, wherein the second sprocket section is rotated about the radial axis from a first orientation in which the second sprocket section is inserted in the passageway to a mating position completing the peripheral portion and hub.

12. The sprocket of claim 11, wherein the first and second set of curved channels curve about the radial axis.

13. The sprocket of claim 11, wherein the hub includes an axial positioning nub on a wall opposite the passageway to facilitate axial positioning of the sprocket on the shaft.

14. The sprocket of claim 11, further comprising a locking tab and a corresponding locking recess for locking the first sprocket section to the second sprocket section in the mating position.

15. The sprocket of claim 14, the locking tab is formed on an outside surface of a hook on the second sprocket section and the locking recess is formed in the first set of curved channels.

16. A sprocket assembly for a conveyor belt, comprising:
- a shaft connected to a conveyor frame, the shaft including an opening in an outer surface;
- a split sprocket mounted on the shaft, the split sprocket comprising
  - a first sprocket section including an open hub for receiving the shaft, a positioning nub on a wall of the open hub configured to engage the opening in the shaft, a peripheral portion, a passageway along a radial axis between the hub and the peripheral portion, at least one curved channel extending from a first face to a second face; and
  - a second sprocket section including at least one curved protrusion configured to be received in the curved channel, wherein the second sprocket section is rotated about the radial axis from a first orientation in which the second sprocket section is inserted in the passageway to a mating position completing the peripheral portion and hub.

17. The sprocket assembly of claim 16, wherein the opening on the shaft outer surface is a slot.

18. The sprocket assembly of claim 16, further comprising a tool including spaced-apart, parallel legs for holding and rotating the second sprocket section about the radial axis to form the sprocket.

* * * * *